(12) United States Patent
Morimoto et al.

(10) Patent No.: US 8,117,629 B2
(45) Date of Patent: Feb. 14, 2012

(54) OPTICAL DISC DEVICE

(75) Inventors: Daisuke Morimoto, Tokyo (JP);
Takaharu Eguchi, Tokyo (JP);
Tatsunori Fujiwara, Tokyo (JP);
Yoshifumi Awakura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 12/666,568

(22) PCT Filed: Aug. 7, 2008

(86) PCT No.: PCT/JP2008/002153
§ 371 (c)(1),
(2), (4) Date: Dec. 23, 2009

(87) PCT Pub. No.: WO2009/031265
PCT Pub. Date: Mar. 12, 2009

(65) Prior Publication Data
US 2010/0205624 A1 Aug. 12, 2010

(30) Foreign Application Priority Data
Sep. 5, 2007 (JP) .................................. 2007-230488

(51) Int. Cl.
*G11B 21/02* (2006.01)
(52) U.S. Cl. ..................................................... 720/664
(58) Field of Classification Search .......... 720/672–679, 720/607, 664
See application file for complete search history.

(56) References Cited

U.S. PATENT DOCUMENTS

| 5,119,362 | A | * | 6/1992 | Yanagisawa | 720/665 |
| 2003/0031111 | A1 | * | 2/2003 | Osada et al. | 369/219 |
| 2003/0194460 | A1 | | 10/2003 | Watanabe et al. | |

FOREIGN PATENT DOCUMENTS

| GB | 2 347 727 A | 9/2000 |
| JP | 61-194853 | 12/1986 |
| JP | 2001-297544 | 10/2001 |
| JP | 2003-308666 | 10/2003 |
| JP | 2004334918 A * | 11/2004 |

* cited by examiner

*Primary Examiner* — Will J Klimowicz
(74) *Attorney, Agent, or Firm* — Birch, Stewart, Kolasch & Birch, LLP

(57) ABSTRACT

A lever having an end rotatably supported by a rack is disposed, a long groove is formed in either another end of the lever or a base chassis and extends in a direction approximately perpendicular to a direction of transporting an optical pickup, a fulcrum member is disposed in either the base chassis or the other end and is rotatably and slidably engaged with the long groove, and to slide along the long groove when the optical pickup is transported, and a spring that always exerts a pushing force in a direction of rotating the lever with the other end being a fulcrum and with the end being a point of action to exert a pushing force of bringing the rack into contact a gear series upon the rack is disposed between a predetermined position of the base chassis and an intermediate position of the lever.

3 Claims, 4 Drawing Sheets (a)

(b)

(c)

| Pickup's Position | Inner Peripheral Position FIG.2(a)-2a | Intermediate Position FIG.2(b)-2b | Outer Peripheral Position FIG.2(c)-2c |
|---|---|---|---|
| Elongation of Spring | Small | Medium | Large |
| $\theta$ | Small | Large | Small |
| B2/B1 | Large | Medium | Small |

OPTICAL DISC DEVICE

FIELD OF THE INVENTION

The present invention relates to an optical disc device. More particularly, it relates to an optical pickup transport mechanism.

BACKGROUND OF THE INVENTION

Typically, an optical pickup transport mechanism uses either a lead screw or a rack gear (referred to as a rack from here on). In the case of an optical pickup transport mechanism using a rack, because components including from a pickup motor to an optical pickup are comprised of a gear series and the rack, it is necessary to remove backlash in the optical pickup transport mechanism which is caused by backlash of the gears. Conventionally, as a method of removing backlash, a technology of pushing an optical pickup toward a direction of the inner radius of a disc with a spring is used (for example, refer to patent reference 1). An example of this method will be explained with reference to FIG. 4.

Assuming the sheet of FIG. 4 as the base chassis of a playback unit, a turntable 10 driven by a motor is assembled in this base chassis. Guide members 11 and 12 are arranged around the turntable 10 in such a way as to be parallel to each other, and an optical pickup 2 is placed in such a way as to slide on these guide members 11 and 12 to move in a straight line toward a traveling direction (an arrow A). The optical pickup 2 moves from an inner peripheral position 2a of a disc 20 which is mounted onto the turntable 10 and is rotating to an outer peripheral position 2c of the disc at the time of playback of the disc, and reads recorded data on the disc 20. The optical pickup 2 is driven by delivering and slowing down the rotation of a motor (not shown) for driving the pickup by using a gear series including a pinion 4, and by converting the rotation into straight-line motion by using a rack 6 fixed to a lateral portion of the optical pickup 2. A spring 8 is disposed in order to remove backlash in the optical pickup transport mechanism which is caused by backlash of the gear series including the pinion 4 and the rack 6. The spring 8 has an end 8a fixed to the base chassis and another end 8b fixed to either the optical pickup 2 or the rack 6, and is placed in such a way as to be parallel (including approximately parallel) to the rack 6 and exerts a pushing force in such a way that the rack 6 is always in contact with the gear teeth of the gear series. As a result, backlash is prevented from occurring among the gears.
[Patent reference 1] JP, 2001-297544, A In the conventional mechanism of transporting the optical pickup, although backlash which is caused by backlash of the rack and the gear series is removed as mentioned above, the elongation of the spring increases from d1 to d2 according to the travelled distance of the optical pickup, as shown in FIG. 4, because the spring is extended in the same direction as that in which the optical pickup is moved. In a case of a disc having a small diameter such as an MD, no problem arises because the travelled distance of the optical pickup is short and the elongation of the spring is therefore small. In contrast, in a case of a disc having a large diameter such as a CD or DVD, the variations in the load of the spring on the optical pickup become remarkable because the elongation of the spring becomes large according to the position to which the optical pickup is moved. As a result, the torque of the pickup motor is affected, and therefore the transporting operation is made unstable and control settings become complicated.

The present invention is made in order to solve the above-mentioned problem, and it is therefore an object of the present invention to provide an optical disc device that makes it possible to reduce the amount of variations in a spring's pushing force for bringing a rack into contact with the gear teeth of a gear series with respect to the travelled distance of an optical pickup.

DISCLOSURE OF THE INVENTION

In accordance with the present invention, there is provided an optical disc device in which a lever having an end which is rotatably supported by a rack is disposed, a long groove is formed in one of another end of the lever and a base chassis in such a way as to extend in a direction approximately perpendicular to a transporting direction of transporting an optical pickup, a fulcrum member is disposed in another one of the other end of the lever and the base chassis in such a way as to be rotatably and slidably engaged with the above-mentioned long groove, and to slide along the long groove when the optical pickup is transported, and a spring that always exerts a pushing force in a direction of rotating the lever with the above-mentioned other end of the lever being a fulcrum and with the above-mentioned end of the lever being a point of action so as to exert a pushing force of bringing the rack into contact gear teeth of a gear series upon the rack is disposed to run between a predetermined position of the base chassis and an intermediate position of the lever.

In accordance with the present invention, the amount of variations in the pushing force of the spring which is exerted upon the rack is reduced with respect to the travelled distance of the optical pickup, and backlash of the gears which is caused by backlash occurring from the rack to a motor for driving the pickup can be prevented from occurring. Therefore, the mechanism for transporting the optical pickup while preventing the transporting operation from becoming unstable due to the difference in the position where the optical pickup is transported and also preventing the control settings from becoming complicated can be constructed.

PREFERRED EMBODIMENTS OF THE INVENTION

Hereafter, a preferred embodiment of the present invention will be described with reference to the accompanying drawings.

Embodiment 1

Figure 1:
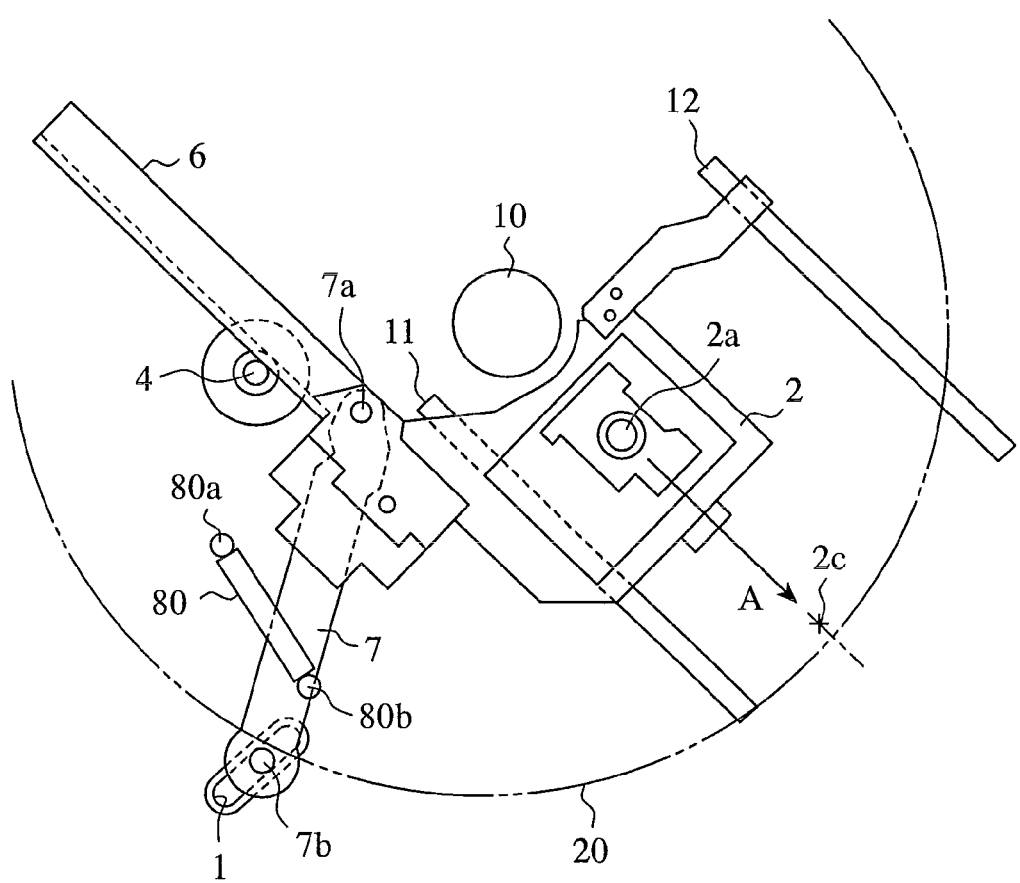
FIG. 1 is a plan view showing the structure of an optical pickup transport mechanism of an optical disc device in accordance with Embodiment 1 of the present invention.
Figures 3, 4:
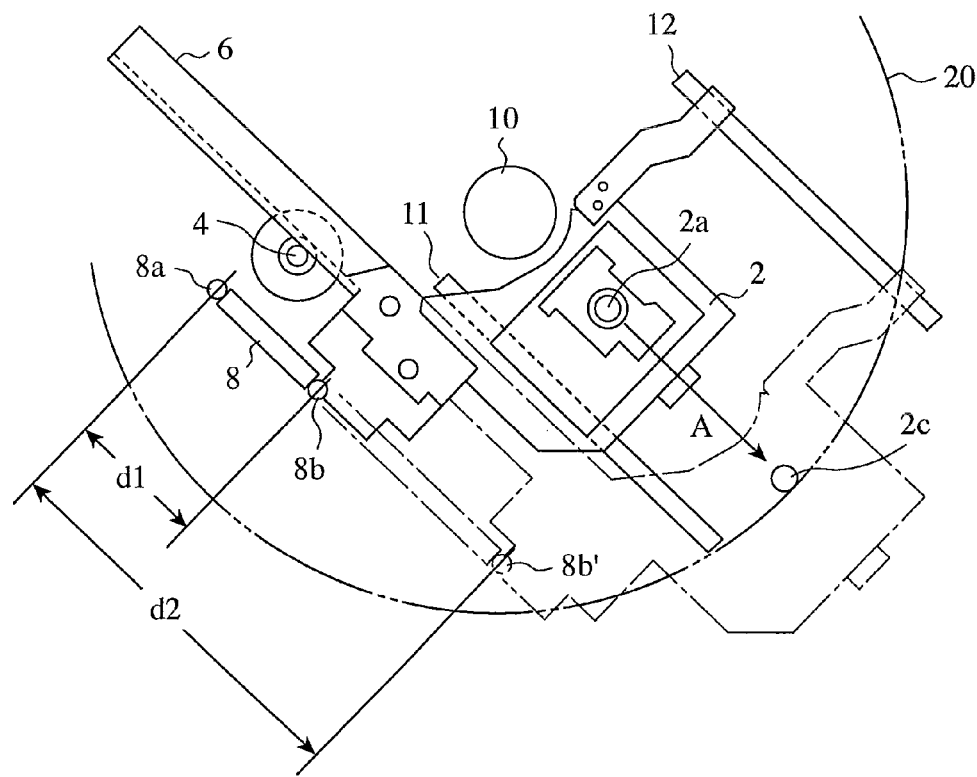
FIG. 3 is an explanatory drawing showing change in the pushing force in each state shown in FIG. 2.
FIG. 4 is a plan view showing the structure of a conventional optical pickup transport mechanism.

FIG. 1 is a plan view showing the structure of an optical pickup transport mechanism of an optical disc device in accordance with Embodiment 1 of the present invention. In the figure, the same portions as those explained, as a conventional art, with reference to FIG. 4 are designated by the same reference numerals as those shown in the figure, and the explanation of the portions will be omitted hereafter in principle.

FIG. 1 shows a state in which an optical pickup 2 is located at an inner peripheral position 2a of a disc 20. A long groove 1 extending in a direction approximately perpendicular to a direction A of transporting the optical pickup 2 is disposed in a base chassis (the sheet of the figure). A lever 7 is disposed to run between this long groove 1 and either the optical pickup 2 or a rack 6. This lever 7 has an end 7a which is rotatably supported by either the optical pickup 2 or the rack 6, and another end 7b which is rotatably and slidably engaged with the long groove 1. A spring 80 having an end 80a fixed to the base chassis (the sheet of the figure) and another end 80b fixed to an intermediate position of the lever 7 is disposed to run between the base chassis and the lever. This spring 80 is disposed to remove backlash in the optical pickup transport mechanism, which is caused by backlash of the rack 6 and a gear series, by way of the lever 7.

Next, the operation of the optical pickup transport mechanism will be explained.

Figure 2:
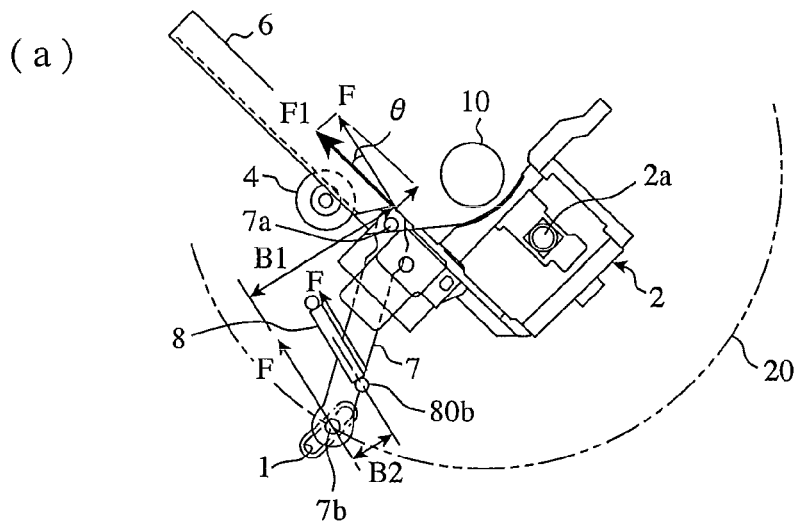
FIG. 2 is an explanatory drawing showing how a pushing force of a spring is exerted according to the position of an optical pickup in accordance with Embodiment 1 of the present invention.
Figure 2:
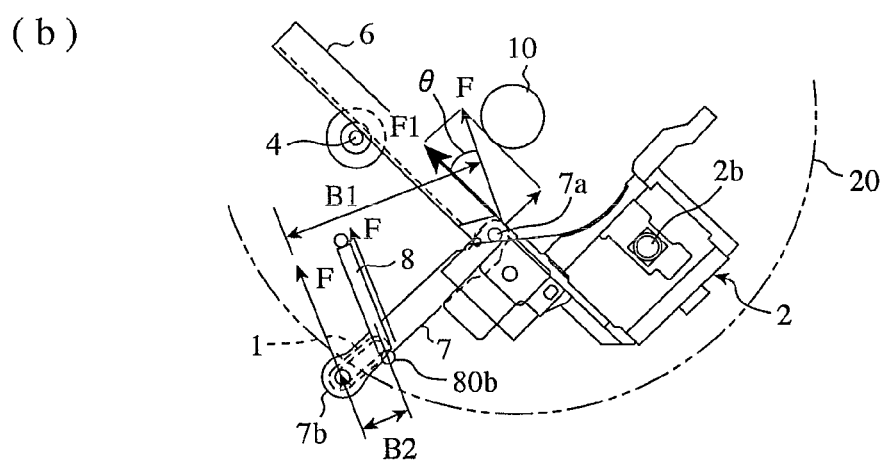
Figure 2:
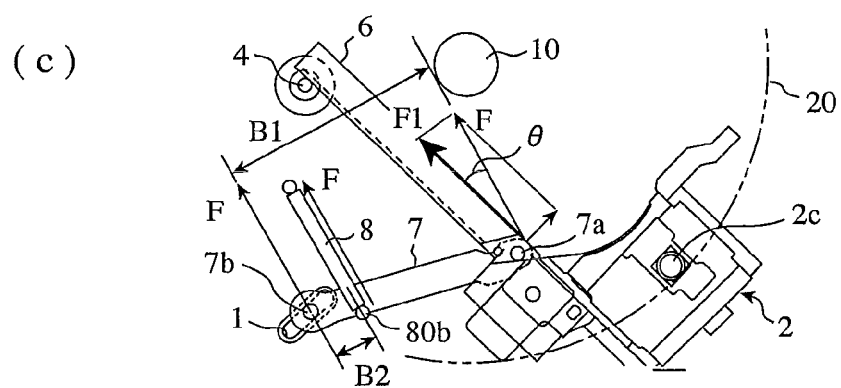

How the pushing force of the spring 80 is exerted upon the optical pickup transport mechanism in a case in which the optical pickup 2 is located at the inner peripheral position (a playback start position) 2a of the disc 20 is shown in FIG. 2(a), how the pushing force of the spring 80 is exerted upon the optical pickup transport mechanism in a case in which the optical pickup 2 is located at an intermediate position 2b is shown in FIG. 2(b), and how the pushing force of the spring 80 is exerted upon the optical pickup transport mechanism in a case in which the optical pickup 2 is located at an outer peripheral position (a playback end position) 2c is shown in FIG. 2(c). A state of the optical pickup transport mechanism at each of the positions shown in FIG. 2 is shown in FIG. 3.

When the optical pickup 2 is transported from the position 2a to the position 2c, the lever 7 is rotated about the other end 7b by the force in the transporting direction exerted upon the end 7a of the lever. At this time, because the other end 7b which serves as a fulcrum (rotation axis) moves along the long groove 1 in a direction approximately perpendicular to the direction of transporting the optical pickup 2, the end 7a of the lever which serves as a point of action has straight-line motion in a direction which is the same as the transporting direction of transporting the optical pickup 2. Furthermore, because the spring 80 is connected to the intermediate position 80b of the lever 7, the spring 80 always exerts a pushing force F which rotates the lever 7 with its other end 7b being the fulcrum (rotation axis) and its end 7a being the point of action upon the intermediate position 80b, which is the point of the lever where the force is applied. Therefore, the point of action 7a and the fulcrum 7b are pushed toward the same direction. A component of force F1 in the transporting direction of the force F appearing at the point of action 7a serves as a pushing force which pushes the rack 6 backwardly toward the pinion 4. The rack 6 and the gear teeth of the pinion 4 are brought into contact with each other because of this pushing force F1, and backlash is therefore prevented from occurring among the gears.

While the amount of travel of the end 7a of the lever 7 is the same as that of the pickup 2, the amount of travel of the intermediate position 80b of the lever 7 is smaller than that of the optical pickup 2. Therefore, the amount of variations in the elongation of the spring 80 connected to the intermediate position 80b with respect to the amount of travel of the optical pickup 2 is reduced. Therefore, because the load of the spring on the optical pickup 2 can be prevented from varying remarkably and therefore the influence exerted upon the torque of the motor for driving the pickup can be reduced, the transporting operation can be stabilized.

Furthermore, because the lever 7 rotates about the other end 7b in the above-mentioned operation, the direction in which the spring 80 exerts the pushing force upon the lever also varies. Therefore, the component of force F1 in the transporting direction of transporting the optical pickup 2 varies according to the position of the optical pickup 2, the ratio of the distance B1 from the fulcrum 7b of the lever 7 to the point of action 7a to the distance B2 from the fulcrum 7b to the power point 80b also varies with respect to the direction in which the spring 80 exerts the pushing force upon the lever.

In a case in which one certain spring is applied, the amount of variations in the elongation of the spring can be adjusted by changing either the intermediate position 80b of the lever 7 to which the spring is fixed or the fixed position 80a on the base chassis to which the spring is fixed, and, as a result, the component of force F1 in the transporting direction of transporting the optical pickup 2, i.e. the pushing force exerted upon the rack 6 can be adjusted. Therefore, a setting in consideration of the load on the optical pickup 2 can be easily made.

As mentioned above, in accordance with this Embodiment 1, in the mechanism for transporting the optical pickup 2 using the rack 6, the long groove 1 extending in a direction approximately perpendicular to the transporting direction of transporting the optical pickup 2 is disposed in the base chassis, the lever 7 having the end 7a which is rotatably supported by either the optical pickup 2 or the rack 6, and the other end 7b which is rotatably and slidably engaged with the long groove 1 is operated when the optical pickup 2 is transported in such a way that the lever rotates about the other end 7b sliding along the long groove 1 and the end 7a moves in a straight line in the transporting direction of transporting the optical pickup 2, and the spring 80 which is disposed to run between the predetermined position 80a of the base chassis and the intermediate position 80b of the lever 7 always exerts a pushing force which rotates the lever 7 with its other end 7b being the fulcrum (rotation axis) and its end 7a being the point of action upon the intermediate position 80b in such a way that a pushing force for bringing the rack 6 with the gear teeth of the gear series is exerted upon the rack 6. Therefore, the amount of variations in the pushing force of the spring which is exerted upon the rack is reduced with respect to the travelled distance of the optical pickup, and backlash in the gears which is caused by backlash occurring from the rack to the motor for driving the pickup can be prevented from occurring. Therefore, the mechanism for transporting the optical pickup while preventing the transporting operation from becoming unstable due to the difference in the position where the optical pickup is transported and also preventing the control settings from becoming complicated can be constructed.

Figure 5:
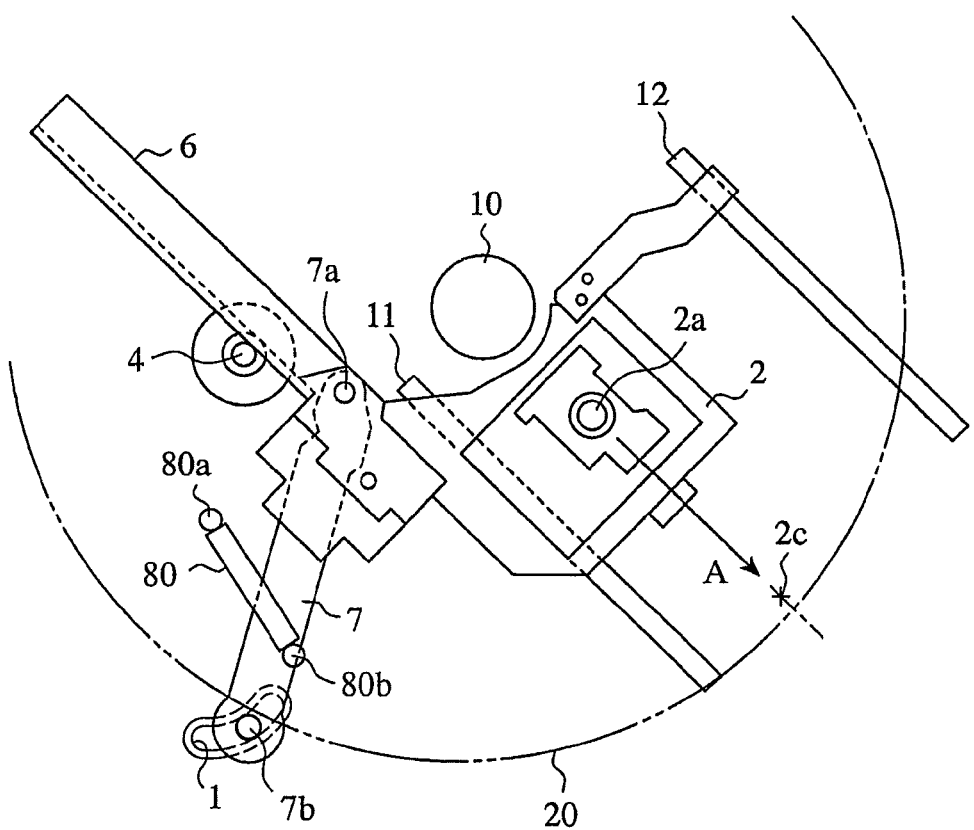
FIG. 5 is a plan view showing a variation in the structure of an optical pick transport mechanism of an optical disc device in accordance with Embodiment 1 of the present invention, in which the long groove is formed to have a curved shape.

In the above-mentioned example, the long groove is shaped in such a way as to extend in a straight line. As an alternative, in order to make the other end of the lever engaged with the long groove more smoothly, the long groove can be formed to have a curved shape as shown in FIG. 5.

Instead of the above-mentioned example, there can be provided an example which is constructed in such a way that an axis is disposed in the base chassis as a fulcrum (rotation axis) member, a long groove which is rotatably and slidably engaged with the axis is formed in the other end of the lever 7, and the lever rotates about this axis. In this example, the same advantages can be expected.

INDUSTRIAL APPLICABILITY

As mentioned above, the optical disc device in accordance with the present invention is constructed in such a way as to be able to exert a pushing force which brings the rack into contact with the gear teeth of the gear series while reducing the amount of variations in the spring with respect to the travelled distance of the optical pickup. Therefore, the optical disc device in accordance with the present invention is suitable for use as an optical disc device, especially as an optical pickup transport mechanism or the like.

The invention claimed is:

1. An optical disc device that converts rotation of a motor to straight-line motion by using a gear series and a rack to transport an optical pickup integral with said rack from an inner peripheral position of a disc to an outer peripheral position of the disc, comprising:
   a lever having first and second ends, the first end being rotatably supported by said rack;
   a long groove formed in one of the second end of said lever and a base chassis, the long groove being formed in such a way as to extend in a direction approximately perpendicular to a transporting direction of transporting said optical pickup;
   a fulcrum member disposed in the one of the second end of said lever and the base chassis in which the long groove is not formed, the fulcrum member being disposed in such a way as to be rotatably and slidably engaged with said long groove, and to slide along said long groove when said optical pickup is transported; and
   a spring that always exerts a pushing force in a direction of rotating said lever with the second end of said lever being a fulcrum and with the first end of said lever being a point of action so as to exert a pushing force of bringing said rack into contact with gear teeth of said gear series upon said rack, the spring being disposed to run between a predetermined position of said base chassis and an intermediate position of said lever.

2. The optical disc device according to claim 1, wherein the long groove is formed into a shape extending linearly.

3. The optical disc device according to claim 1, wherein the long groove is formed into a shape extending curvedly.

* * * * *